United States Patent [19]
Chiu et al.

[11] Patent Number: 5,978,215
[45] Date of Patent: Nov. 2, 1999

[54] COMPUTER BOTTOM KEYBOARD INCORPORATING ARRANGEMENT FOR ENHANCED COOLING

[75] Inventors: George Liang-Tai Chiu, Cross River; Thomas Mario Cipolla, Katonah; Lawrence Shungwei Mok, Brewster, all of N.Y.

[73] Assignee: International Business Machines Corporation, Armonk, N.Y.

[21] Appl. No.: 08/902,703

[22] Filed: Jul. 30, 1997

[51] Int. Cl.[6] .................................................. G06F 1/16
[52] U.S. Cl. ...................... 361/687; 361/727; 312/208.3; 400/714
[58] Field of Search ..................... 361/687, 727, 361/680; 312/223.2, 21, 223.3, 208.3; 235/462.3, 462.45; 400/714, 713; 381/87, 88, 24; D14/106; G06F 1/16

[56] References Cited

U.S. PATENT DOCUMENTS

| | | | |
|---|---|---|---|
| D. 371,118 | 6/1996 | Kondo | D14/106 |
| D. 377,009 | 12/1996 | Crane, Jr. et al. | D14/106 |
| 5,190,258 | 3/1993 | Yu | 312/208.3 |
| 5,555,489 | 9/1996 | Keskinen | 361/683 |
| 5,675,426 | 10/1997 | Meisner et al. | 381/24 |
| 5,818,690 | 10/1998 | Spencer | 361/680 |

FOREIGN PATENT DOCUMENTS

| | | | |
|---|---|---|---|
| 3-177915 | 8/1991 | Japan | G06F 1/16 |
| 5-324124 | 5/1992 | Japan | G06F 1/16 |
| 07230341 | 8/1995 | Japan | G06F 1/16 |

OTHER PUBLICATIONS

Albert Yu, "The Future of Microprocessors", *IEEE Micro*, Dec. 1996, pp. 46–53.

*Primary Examiner*—Lynn D. Feild
*Assistant Examiner*—Lisa Lea-Edmonds
*Attorney, Agent, or Firm*—Scully, Scott, Murphy & Presser; Daniel P. Morris, Esq.

[57] ABSTRACT

An arrangement and method for increasing the cooling capacity of portable personal computers, particularly such as laptop or notebook computers, wherein the computer possesses a keyboard having the rear edge thereof hingedly connected with the bottom of an openable display unit or panel, and wherein at least portions of the computer electronics are housed in outwardly swivable or slidable compartment structure located above the keyboard so as to provide increased surface areas for dissipation of heat.

18 Claims, 5 Drawing Sheets

COMPUTER BOTTOM KEYBOARD INCORPORATING ARRANGEMENT FOR ENHANCED COOLING

BACKGROUND OF THE INVENTION

The present invention relates to an arrangement for enhancing the cooling capacity of portable personal computers. More particularly, the invention is directed to the provision of an arrangement for increasing the cooling capacity of portable personal computers, particularly such as laptop or notebook computers, wherein the computer possesses a keyboard having the rear edge thereof hingedly connected with the bottom of an openable display unit or panel, and wherein at least portions of the computer electronics are housed in swivable or slidable compartment structure located above the keyboard.

The capacity and performance of portable personal computers, such as laptop computers, notebook computers or the like, has recently been enhanced to such an extent that; for example, since the beginning of 1996, the thermal dissipation requirements of portable personal computers (PCs) have increased from about 10 watts to 20 watts and even higher values. This increase in the thermal dissipation requirements is a result of ever increasing CPU performance and additional functionality; such as DVD, modem, audio and the like, which are provided by future PCs. As elucidated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; for instance, the cooling limit for a portable PC without a cooling fan is currently approximately 15 to 20 watts. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

SUMMARY OF THE INVENTION

In order to meet the requirements in enhancing the cooling capacities of portable personal computers, pursuant to the present invention, a personal computer, such as a laptop computer having an openable display panel and a keyboard located at the bottom thereof so as to provide a hinged interconnection, has at least portions of the electronics housed in one or more compartments located above the keyboard in substantially parallel spaced relationship therewith.

These electronic-housing compartments can be either swung outwardly of the keyboard housing or slide apart so as to unfold toward both sides or at least one side of the keyboard to facilitate enhanced cooling of the electronics in the compartments in view of an increase in exposed surface areas, thereby meeting thermal dissipation requirements at contemplated higher power and wattage limits.

Pursuant to a specific embodiment of the invention, the portions of the electronics are housed in two compartments extend above the keyboard which are coextensive with the keyboard housing and at the pivotally connected outer rear edge of each compartment with the keyboard housing so as to be able to swing in a horizontal plane above the keyboard housing in outwardly pivoted spaced apart directions, and thus provide increased surface areas for an enhanced cooling capacity of the electronic elements.

Pursuant to a modified embodiment, the compartments are respectively hinged along the opposite side edges of the keyboard housing and are adapted to swing upwardly and outwardly to provide increased cooling surface areas.

Another embodiment of the invention contemplates the compartments having the electronic elements to be slidably connected to the keyboard housing along the front and rear edges of the latter so as to be adapted to slid apart towards the opposite sides of the keyboard housing instead of being hingedly connected therewith.

Accordingly, it is an object of the present invention to provide an arrangement for increasing the cooling capacity of portable personal computers.

A more specific object of the present invention is to provide a cooling arrangement for portable personal computers, such as laptop computers having bottom keyboards and therewith hingedly connected openable display panels, in which at least portions of the electronics are provided in compartments arranged in closely spaced proximity and in parallel relationship above the keyboard and wherein the compartments are adapted to be displaced away from the keyboard so as to increase exposed surface areas and resultingly enhance the power dissipation of the personal computer.

In accordance with a particular object of the invention, the compartments are hingedly connected to a housing for the keyboard at the rear outer corners thereof so as to pivot horizontally outwardly in a parallel plane above the upper surface of the keyboard.

Pursuant to another object of the present invention, the compartments are hingedly connected to the opposite side edges of the keyboard so as to be adapted to swung upwardly and outwardly of the keyboard to provide for the enhanced cooling capacity of the electronic components in the compartments.

In accordance with a still further object of the invention, the compartments housing the portions of the electronics are arranged in slidable connection with the keyboard and are adapted to be slid laterally outwardly towards the opposite sides of the keyboard.

BRIEF DESCRIPTION OF THE DRAWINGS

Reference may now be had to the following detailed description of exemplary embodiments of the invention, taken in conjunction with the accompanying drawings; in which.

DETAILED DESCRIPTION OF PREFERRED EMBODIMENTS

Figure 1:
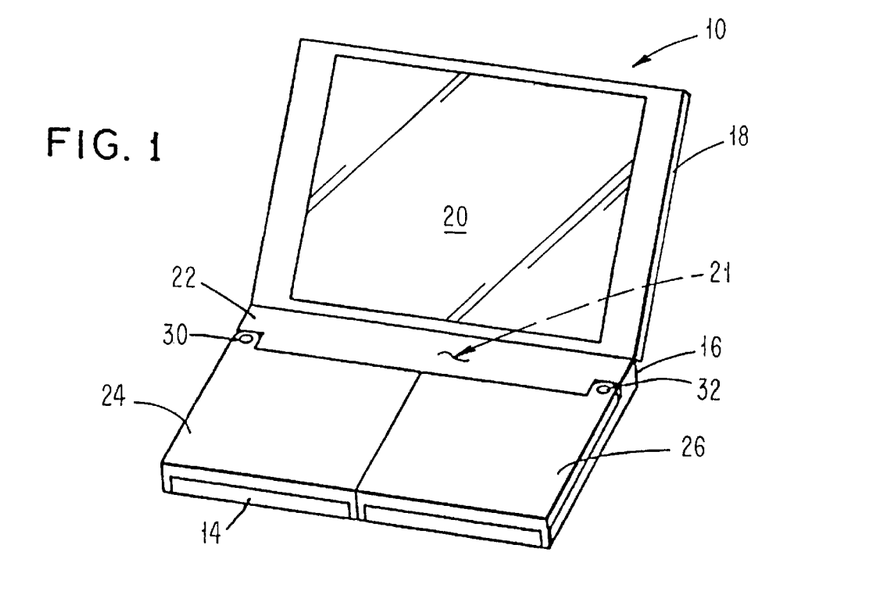
FIG. 1 illustrates, in a perspective view, a first embodiment of a portable personal computer, such as laptop computer with a bottom keyboard, showing the display panel in the opened position, with two compartments storing portions of electronics being arranged above a keyboard in their closed position.
Figure 2:
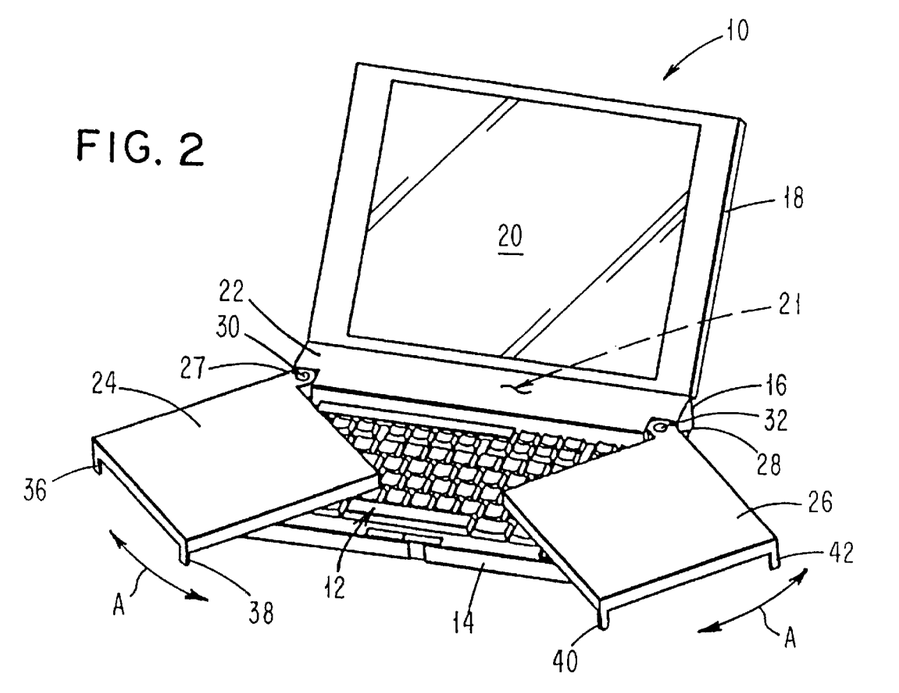
FIG. 2 illustrates the personal computer of FIG. 1 with the two compartments illustrated in a partially opened position.
Figure 3:
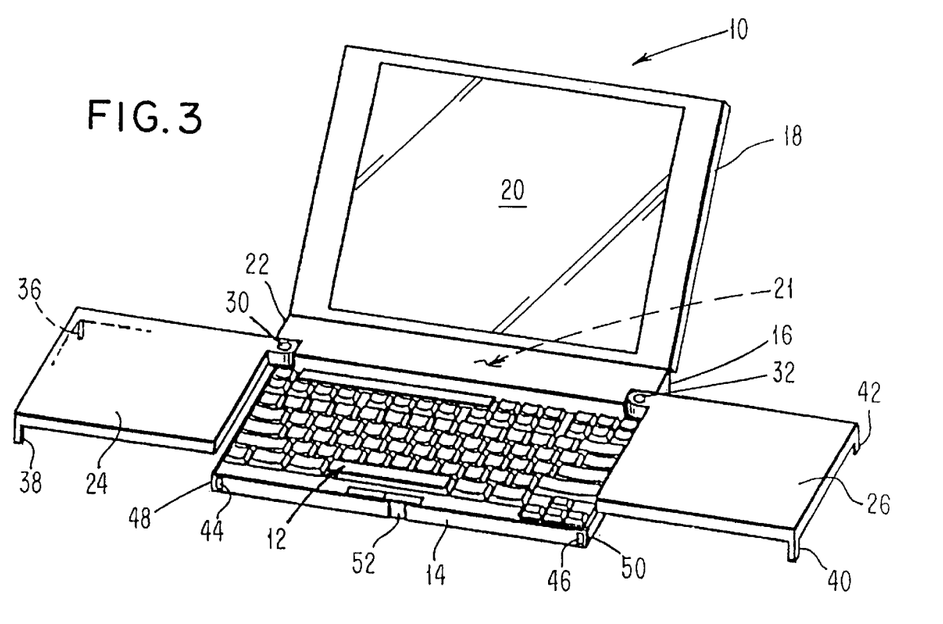
FIG. 3 illustrates the compartments in their fully opened and operative position.

Referring now specifically to the drawings, and especially to the embodiment of the portable personal computer illustrated in FIGS. 1 through 3 of the drawings, FIG. 1 illustrates a personal computer in the form of a laptop computer 10 having a bottom keyboard 12 which is housed in a generally flat rectangular structure 14 adapted to be supported on a suitable horizontal or flat surface; and which preferably, but not necessarily, has the rectangular configuration in the A4 form factor, as is well known in the technology. Hingedly connected to the rear edge 16 of the keyboard housing 14 is a display panel 18 which, in the inoperative position or stored condition of the personal computer 10 is usually folded flat over the keyboard housing 14 so as to provide a compact arrangement. As illustrated, when it is desired to utilize the personal computer, the display panel 18 is pivoted upwardly so as to fully expose the computer display screen 20, preferably at a somewhat rearwardly inclined position relative to the horizontal extent of the bottom keyboard 12, and with the display screen facing forwardly towards the user.

The CPU 21 and various other electronic components (not shown) of the computer may generally be housed in a rear compartment section 22 of the structure 14 housing the keyboard 12. In order to be able to increase the cooling capacity, in essence, the power dissipation in the form of generated heat, of the personal computer 10, in view of the ever increasing thermal dissipation requirements thereof, various electronic components (not shown) are adapted to be contained in compartments 24, 26 located closely above the keyboard 12 and operatively connected to the keyboard housing 14.

In this embodiment, each of the compartments 24, 26 is hinged at its respective rearwardly located outer corner 27, 28 through the intermediary a hinge structure 30, 32 to the opposite rear corners keyboard housing structure 14 so as to be pivotable in the direction of arrows A about their respective hinge points, as illustrated in FIG. 2 of the drawings. This exposes the bottom keyboard 12 to user for operative purposes, and concurrently provides an increased cooling surface area for the electronic components which are contained in the compartments 24, 26 to resultingly enhance the cooling capacity of the computer 10.

As shown in the drawings, the compartments 24, 26 are each of a generally rectangular configuration, each respectively approximately one-half the size of the upper surface area of the keyboard housing 14. The compartments 24, 26 are equipped with depending legs 36, 38, 40, 42 which, when the compartments 24, 26 are pivoted outwardly, as shown by the arrows A in FIG. 3, and being of a height equal to the keyboard housing 14, provide supports for the compartments 24, 26 on a surface which also supports the keyboard 12, and in essence the overall personal computer 10. In the closed position of the compartments 24, 26, as shown in FIG. 1, the respective legs will enter into slots or recesses 44, 46 formed in the outer corners at the front edges 48, 50 of the keyboard housing 14, while the other legs, towards the front inner corners of the compartments are engaged in a slot or recess 52 formed centrally in the front edge of the keyboard housing. These legs upon nesting into the recesses in the closed condition of the compartments 24, 26 will conform to the outer rectangular configuration of the keyboard housing 14, and upon the closing of the display panel 18 of the personal computer 10, will impart a smooth, rectangular outer contour to the entire computer.

Figure 4:
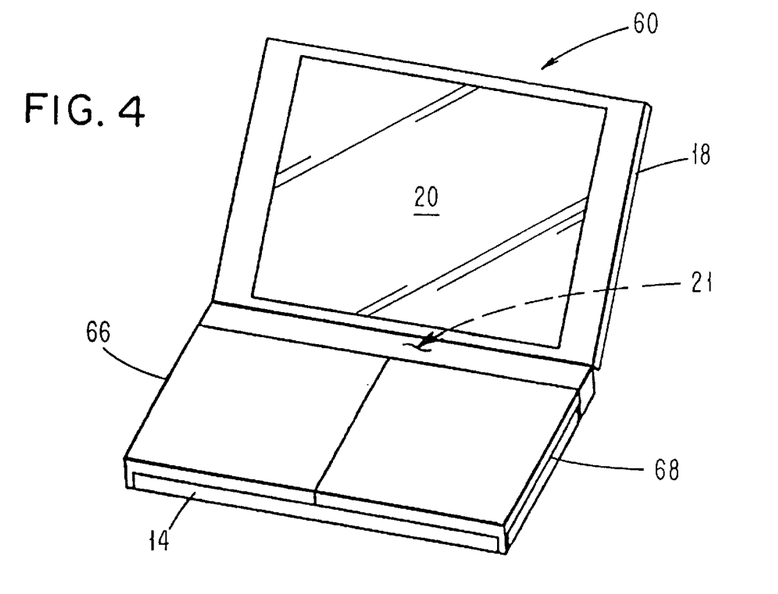
FIG. 4 illustrates a perspective view of second embodiment of the portable personal computer with the compartments containing the electronic components shown in their closed position.
Figure 5:
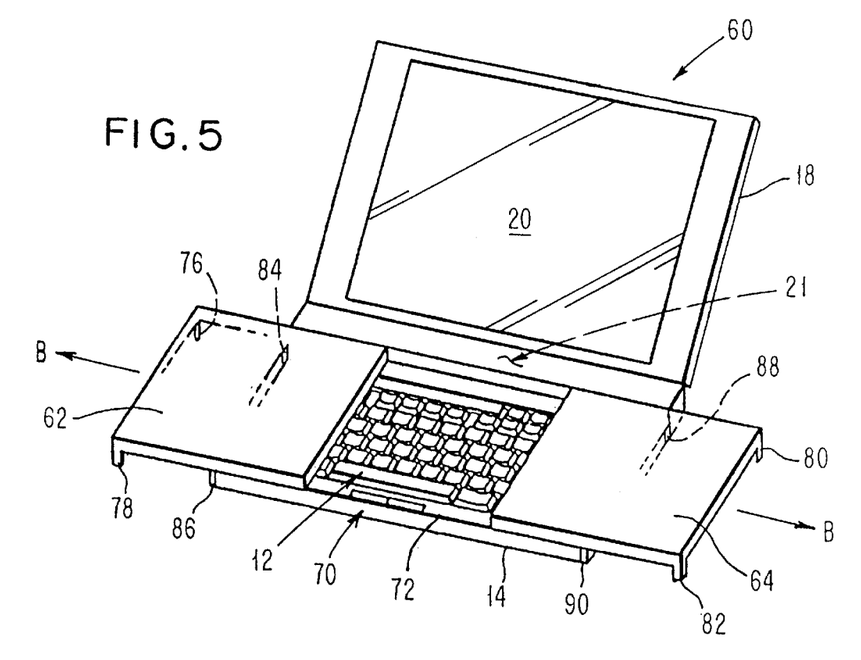
FIG. 5 illustrates the personal computer of FIG. 4 with the compartments shown in a partially opened slid apart position.
Figure 6:
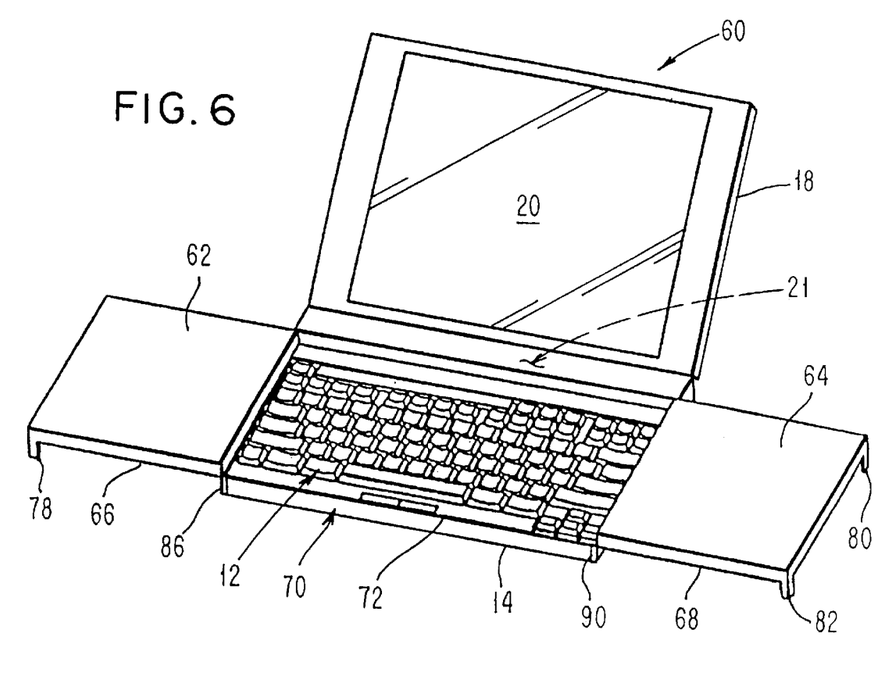
FIG. 6 illustrates the personal computer of FIG. 4 with the compartments shown in their fully slid apart and opened operative position.

Referring to the second embodiment of the invention, as shown in FIGS. 4 to 6, components which are identical with or similar to those in the first embodiment of FIGS. 1 to 3 are identified by the same reference numerals and are not described in further detail. In this instance, in comparison with the embodiment of FIGS. 1 to 3, the computer 60 has the compartments 62, 64 above the keyboard 12 possess lower surfaces 66,68 which include slide or rail structure 70 which engages into a groove 72 formed along the front edge 74 of the housing 14 containing the keyboard 12. Thus, as shown in FIGS. 5 and 6 of the drawings, the compartments 62,64 housing portions the electronics are adapted to be slid outwardly in opposite directions along arrows B towards the sides of the keyboard 12 so as to form a larger exposed surface for an increased cooling capacity. Legs 76, 78,80 and 82 which are integrally formed with and depend downwardly from the outer corners of the compartments 62,64 housing the electronic components are adapted to rest on any surface supporting the bottom of the keyboard housing 14, the legs each being of a height corresponding to that of the keyboard housing 14 below the compartments. When it is desired to close the compartments 62,64, so as to place the personal computer 60 into its undeployed condition, as in FIG. 4, they are merely slid together so as to join towards the center of the keyboard, and with the depending legs at the outer corners of each of the compartments nesting into respective slots or recesses 84,86,88 and 90 formed in the corners of the keyboard housing 14 so as to impart a smooth rectangular configuration to the personal computer 60, particularly when the display panel 18 is folded down into the closed position over the compartments.

Figure 7:
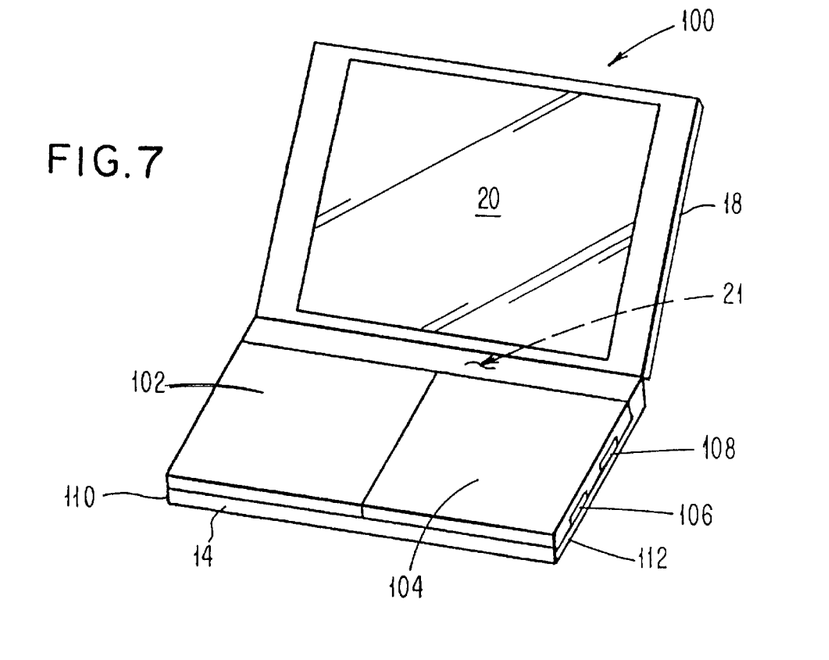
FIG. 7 illustrates a perspective view of a third embodiment of the personal computer, showing the compartments housing electronic components hingedly connected to opposite ends of the keyboard and in their closed position.
Figure 8:
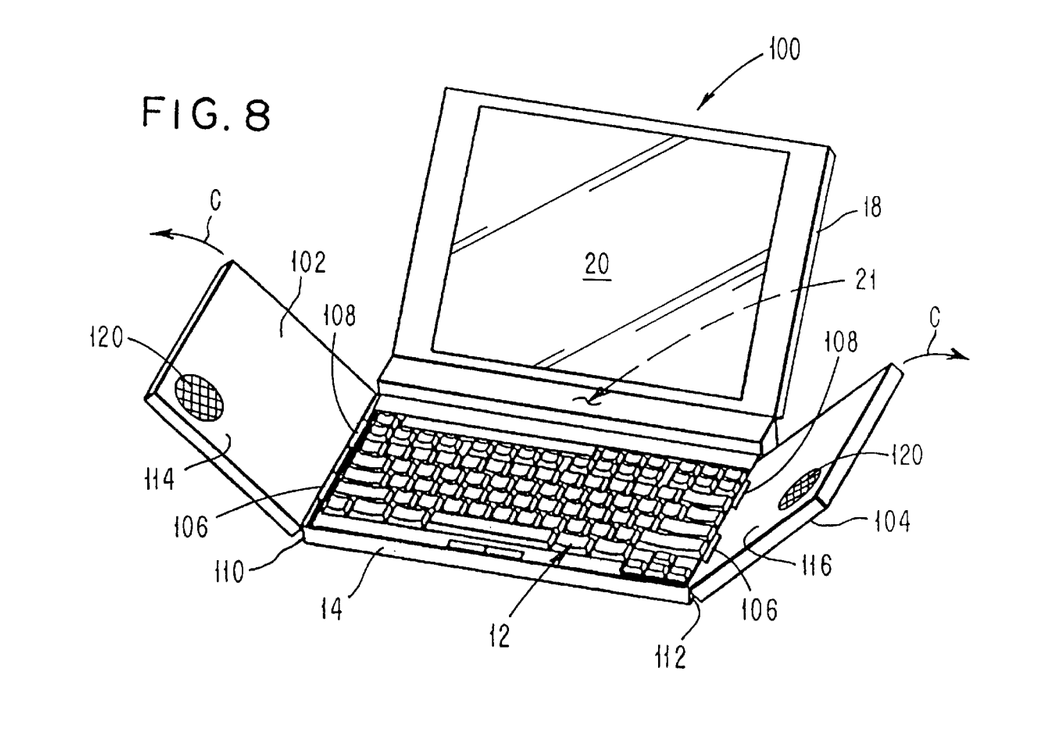
FIG. 8 illustrates the personal computer of FIG. 7 with the compartments shown swung into a partially opened position.
Figure 9:
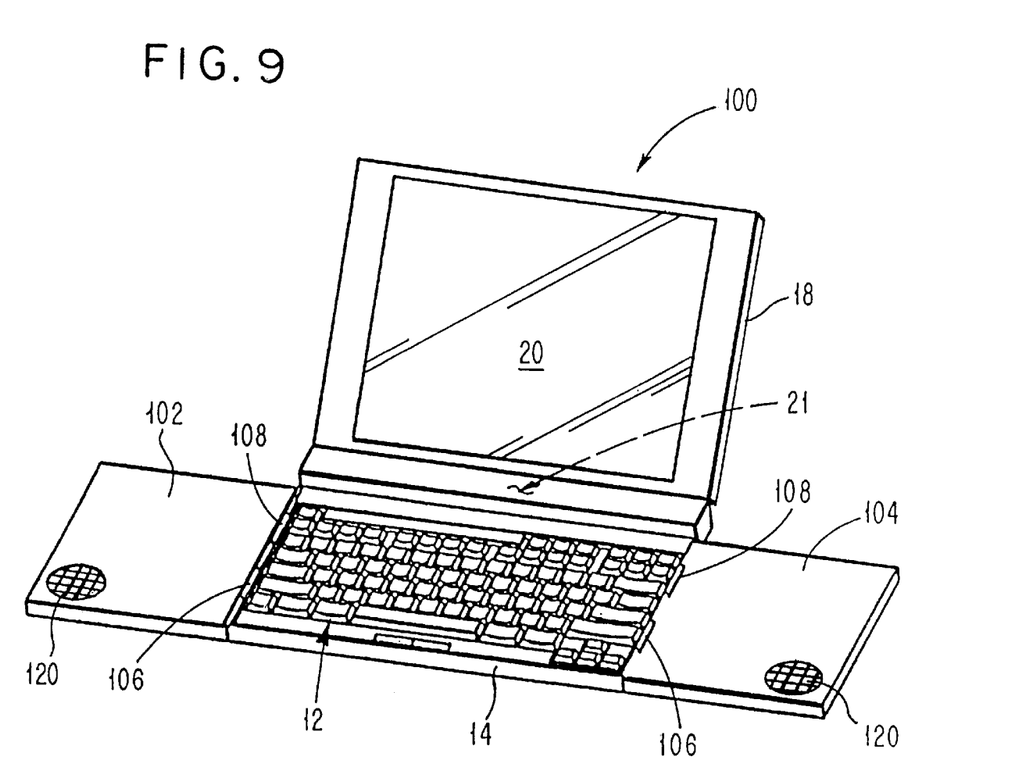
FIG. 9 illustrates the personal computer of FIG. 7 illustrating the compartments in their fully opened position.

Reverting now to the embodiment of FIGS. 7 through 9 of the drawings, in which components which are identical with or similar to those of the previous embodiments are identified by the same reference numerals, in this construction of the computer 100, each of the compartments 102,104 containing at least portions of the electronics, possess hinges 106,108 so as to be hinged to the opposite outer end edges 110,112 of the keyboard housing 14. This will facilitate the upward and outward pivoting of the respective compartments, as shown by arrows C in FIG. 8 of the drawings. As indicated, in this instance, rather than pivoting each of the compartments 102,104 completely outwardly through an angle of 180° so that the bottom surfaces 114,116 of the compartments lay flat on a support surface for the bottom of the keyboard housing 14, as shown in FIG. 9; in FIG. 8 the compartments 102, 104 are shown each swung outwardly to only an angular displacement of; for example, about 135° or the like, and wherein this pivoting action enables suitable audio devices or speakers 120 to be installed in the compartments 102,104. In this particular embodiment, the hinging of the compartments 102,104 to the outer side or end edges 110,112 of the keyboard housing 14, and dimensioning these so as to be correlated with the height of the keyboard housing 14 in the layflat extended positions shown in FIG. 9, eliminates the need for forming depending legs on the compartments as is the case in the other embodiments.

Locating at least portions of the electronics in the compartment eliminates the need for arranging any or requires only a few components of electronics to be located beneath the keyboard 12, and consequently only very small amounts of heat are generated within this particular area, while the keyboard housing is fully supported on any surface.

The compartments which are openable so as to expose the keyboard thus provide increased and relatively large surface areas for cooling and thermal dissipation, and any PCMCIA, DVD and other components are at a considerable distance from the CPU, the latter of which is arranged towards the rear of the keyboard housing 14 so as to be able to be cooled more easily. In the region in which the CPU is located, normally this area is not in touch with any fingers of the user, and thus can be permitted to rise to temperature of up to 60° C. rather than the 35° C. normally permitted for the keyboard. Inasmuch as the heat dissipation by providing the openable compartments is not proportional to 60° C. ambient temperature rather than 35° C. ambient temperature, additional cooling capacity has been obtained, and by means of these aspects it is possible to contemplate dissipating an additional 10 watts without the use of a fan and possibly 20 watts with the use of a fan. The utilization of the upwardly swingable compartments 102,104 of the embodiment of FIGS. 7 through 9, permits the incorporation of the speakers 120 in each of the compartments so as to provide an enhanced stereo sound.

Although the compartments of each of the embodiments are illustrated as being openable manually, it is also possible to incorporate operative structure, for example, whereby upon opening of the display panel, the respectively compartments housing the electronic components are automatically pivoted open or slid apart outwardly, depending upon the embodiment under consideration, although this may entail the incorporation of additional and possibly expensive components.

From the foregoing, it becomes readily apparent that the present invention provides for simple arrangement adapted to increase the cooling capacity of the computers so as to remove heat in view of the increased thermal dissipation requirements of portable computers.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what we claim as new, and desire to secure by Letters Patent is:

1. An arrangement for enhancing the cooling capacity of a computer by dissipating heat generated by electronic components, said computer having a bottom housing for a keyboard and a display panel hingedly connected with said keyboard housing proximate a rear edge thereof; said arrangement comprising compartments located in close proximity above said keyboard intermediate said display panel and said housing, said compartments each containing at least one said electronic component generating heat during operation of said computer; and means movably connecting said compartments with said housing enabling said compartments to be displaced outwardly of said keyboard housing upon opening of said panel so as to provide an increased surface area for dissipating heat generated by said at least one electronic component in each of said compartments and to be retracted within the perimetrical confines of said housing above said keyboard during non-use of said computer.

2. An arrangement as claimed in claim 1, wherein two of said compartments are located in coplanar relationship above said keyboard, said compartments in the closed condition of said computer jointly having a perimetrical configuration substantially in conformance with that of the keyboard housing.

3. An arrangement as claimed in claim 2, wherein each of said compartments includes hinge means at an outer rear corner forming a pivot point for hingedly connecting each of said compartments to said housing so as to facilitate pivoting each said respective compartment outwardly in a plane essentially in parallel with and above the upper surface of said keyboard housing so as to provide said increased heat dissipating surface area.

4. An arrangement as claimed in claim 2, wherein each said compartment is substantially rectangular and includes depending leg portions at front corners thereof, said leg portions being of a height to form supports on a surface on which said keyboard housing is supported in the outwardly pivoted positions of said compartments, and said leg portions being adapted to engage into recesses formed in the housing in the inwardly retracted pivoting positions of said compartments.

5. An arrangement as claimed in claim 2, wherein each said compartment is substantially rectangular and includes hinge means hingedly connecting the outer side edge with an adjacent outer side edge of the housing for said keyboard, said compartments each being outwardly pivotable about said hinge means to form said increased surfaces for dissipating heat generated by said at least one electronic component during operation of said computer.

6. An arrangement as claimed in claim 5, wherein each said compartment incorporates speaker means to impart an enhanced stereo sound to said computer.

7. An arrangement as claimed in claim 2, wherein said compartments are each slidably mounted on the housing so as to be outwardly displaceable in coplanar parallel relationship towards opposite sides of said housing and providing increased surface areas for dissipating heat generated by said at least one electronic component arranged therein during operation of said computer.

8. An arrangement as claimed in claim 7, wherein said compartments are each rectangular and have depending legs at corners thereof coextensive with the height of the housing so as to form supports on a surface on which the housing is positioned in the operative condition of the computer.

9. An arrangement as claimed in claim 2, where the surface areas of said compartments are enabled to rise to a higher temperature for additional heat dissipation than surfaces on said computer which are normally contacted by a user during operation of the computer.

10. A method for enhancing the cooling capacity of a computer by dissipating heat generated by electronic components, said computer having a bottom housing for a keyboard and a display panel hingedly connected with said keyboard proximate a rear edge thereof; said method comprising locating compartments in close proximity above said keyboard intermediate said display panel and said housing, said compartments each containing at least one electronic component generating heat during operation of said computer; movably connecting said compartments with said computer housing for displacing said at least one compartment outwardly of said housing upon opening of said panel so as to provide an increased surface area for dissipating heat generated by said at least one electronic component in each of said compartments and retracting said compartments into the perimetrical confines of said housing above said keyboard during non-use of said computer.

11. A method as claimed in claim 10, wherein two of said compartments are located in coplanar relationship above said keyboard, said compartments in the closed condition of said computer jointly having a perimetrical configuration substantially in conformance with that of the keyboard housing.

12. A method as claimed in claim 11, wherein each of said compartments includes hinge means at an outer rear corner forming a pivot point for hingedly connecting each of said compartments to said housing so as to facilitate pivoting each said compartment outwardly in a plane essentially in parallel with and above the upper surface of said keyboard housing so as to provide said increased heat dissipating surface area.

13. A method as claimed in claim 11, wherein each said compartment is substantially rectangular and includes depending leg portions at front corners thereof, said leg portions being of a height to form supports on a surface on which said keyboard housing is supported in the outwardly pivoted positions of said compartments, and said lea portions being adapted to engage into recesses formed in the housing in the inwardly retracted pivoting positions of said compartments.

14. A method as claimed in claim 11, wherein each said compartment is substantially rectangular and includes hinge means hingedly connecting an outer side edge with an adjacent outer side edge of the housing for said keyboard, said compartments each being outwardly pivotable about said hinge means to form said increased surfaces for dissipating heat generated by said at least one electronic component during operation of said computer.

15. A method as claimed in claim 14, wherein each said compartment incorporates speaker means to impart an enhanced stereo sound to said computer.

16. A method as claimed in claim 11, wherein said compartments are each slidably mounted on said housing so as to be outwardly displaceable in coplanar parallel relationship towards opposite sides of said keyboard and thereby providing increased surface areas for dissipating heat generated by said at least one electronic component arranged therein during operation of said computer.

17. A method as claimed in claim 16, wherein said compartments are each rectangular and have depending legs at corners thereof coextensive with the height of the housing so as to form supports on a surface on which the housing is positioned in the operative condition of the computer.

18. A method as claimed in claim 12, where the surface areas of said compartments during computer operation are enabled to rise to a higher temperature than surfaces on said computer which are normally contacted by a user during operation of the computer.

* * * * *

UNITED STATES PATENT AND TRADEMARK OFFICE
CERTIFICATE OF CORRECTION

PATENT NO. : 5,978,215
DATED : November 2, 1999
INVENTOR(S) : George L. Chiu, et al.

It is certified that error appears in the above-identified patent and that said Letters Patent is hereby corrected as shown below:

Column 1, line 54: "These electronic-housing..." should not begin a new paragraph.

Column 7, line 29: "lea" should read --leg--

Column 8, line 25, Claim 18: "claim 12" should read --claim 11--

Signed and Sealed this

Twenty-first Day of November, 2000

Q. TODD DICKINSON

*Attest:*

*Attesting Officer*     *Director of Patents and Trademarks*